US010124254B2

(12) United States Patent
Sato et al.

(10) Patent No.: US 10,124,254 B2
(45) Date of Patent: *Nov. 13, 2018

(54) VIDEO GAME PROCESSING APPARATUS AND VIDEO GAME PROCESSING PROGRAM

(71) Applicant: KABUSHIKI KAISHA SQUARE ENIX, Tokyo (JP)

(72) Inventors: Yasuhiro Sato, Tokyo (JP); Naofumi Takuma, Tokyo (JP); Hiroaki Iwano, Tokyo (JP)

(73) Assignee: KABUSHIKI KAISHA SQUARE ENIX, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/491,295

(22) Filed: Apr. 19, 2017

(65) Prior Publication Data

US 2017/0282064 A1 Oct. 5, 2017

Related U.S. Application Data

(63) Continuation of application No. 14/167,322, filed on Jan. 29, 2014, now Pat. No. 9,656,164.

(30) Foreign Application Priority Data

Apr. 8, 2013 (JP) ................. P2013-080668

(51) Int. Cl.
*A63F 13/40* (2014.01)
*A63F 13/30* (2014.01)
(Continued)

(52) U.S. Cl.
CPC .............. *A63F 13/30* (2014.09); *A63F 13/44* (2014.09); *A63F 13/58* (2014.09); *A63F 13/847* (2014.09); *A63F 13/795* (2014.09); *A63F 13/822* (2014.09)

(58) Field of Classification Search
CPC .......... A63F 13/10; A63F 13/44; A63F 13/58; A63F 13/795; A63F 13/822; A63F 13/847
(Continued)

(56) References Cited

U.S. PATENT DOCUMENTS

| 7,024,681 B1* | 4/2006 | Fransman | .......... H04N 7/17327 |
| | | | 348/E5.008 |
| 7,730,034 B1 | 6/2010 | Deflaux et al. | |

(Continued)

FOREIGN PATENT DOCUMENTS

| JP | 2005-034303 | 2/2005 |
| JP | 2006-239450 | 9/2006 |

(Continued)

OTHER PUBLICATIONS

Office Action from Japan Patent Office (JPO) in Japanese Patent Appl. No. 2013-080668, dated Aug. 12, 2014, along with an English language translation.

(Continued)

*Primary Examiner* — Michael Cuff
(74) *Attorney, Agent, or Firm* — Greenblum & Bernstein, P.L.C.

(57) ABSTRACT

A video game processing apparatus for controlling progress of a video game is provided. In the video game, a plurality of players addresses a common task. The video game processing apparatus includes a processor and a display controller. The processor specifies a task corresponding to a task providing request of a first player and generates player related information of a second player corresponding to the specified task. The display controller displays, on a task screen, an image including a character string in association with the second player. The character string satisfies a display condition during progress of the specified task. The task screen indicates the specified task.

6 Claims, 8 Drawing Sheets

(51) Int. Cl.
  *A63F 13/44*  (2014.01)
  *A63F 13/58*  (2014.01)
  *A63F 13/847* (2014.01)
  *A63F 13/795* (2014.01)
  *A63F 13/822* (2014.01)

(58) Field of Classification Search
  USPC .......................................................... 463/31
  See application file for complete search history.

(56) References Cited

U.S. PATENT DOCUMENTS

| | | | |
|---|---|---|---|
| 8,287,378 | B2 | 10/2012 | Ogawa |
| 2005/0021159 | A1 | 1/2005 | Ogawa |
| 2007/0060359 | A1 | 3/2007 | Smith |
| 2007/0174183 | A1* | 7/2007 | Jung .................... G06Q 40/025 705/38 |
| 2007/0213975 | A1 | 9/2007 | Shimoda |
| 2010/0015579 | A1 | 1/2010 | Schlabach |
| 2010/0056275 | A1 | 3/2010 | Wilson et al. |
| 2010/0174593 | A1 | 7/2010 | Cao et al. |
| 2010/0175031 | A1 | 7/2010 | Alton |
| 2010/0190555 | A1 | 7/2010 | Dutilly et al. |
| 2010/0234096 | A1 | 9/2010 | Hazama et al. |
| 2010/0293412 | A1* | 11/2010 | Sakaguchi .......... G06F 11/0727 714/17 |
| 2011/0181683 | A1 | 7/2011 | Nam |
| 2011/0321074 | A1 | 12/2011 | Marin et al. |
| 2012/0069131 | A1 | 3/2012 | Abelow |
| 2012/0303629 | A1 | 11/2012 | Klein et al. |
| 2013/0005480 | A1 | 1/2013 | Bethke |
| 2013/0083003 | A1 | 4/2013 | Perez et al. |
| 2013/0138523 | A1* | 5/2013 | Tsuboi ............... G06Q 30/0601 705/26.1 |
| 2013/0212491 | A1 | 8/2013 | Yerli |
| 2014/0031130 | A1 | 1/2014 | Janakiraman et al. |
| 2014/0071288 | A1 | 3/2014 | Kim |
| 2014/0213356 | A1 | 7/2014 | Iwano et al. |
| 2014/0243089 | A1 | 8/2014 | Tsukioka et al. |
| 2014/0280134 | A1 | 9/2014 | Horen et al. |
| 2014/0287811 | A1 | 9/2014 | Weiss et al. |

FOREIGN PATENT DOCUMENTS

| | | |
|---|---|---|
| JP | 2008-096542 | 4/2008 |
| JP | 2010-099161 | 5/2010 |
| JP | 2010-131082 | 6/2010 |
| JP | 2011-000377 | 1/2011 |
| JP | 2014-200555 | 10/2014 |

OTHER PUBLICATIONS

"*Antecedently Revealed Contents of 'The Battle of the Order of Chivalry'—Kaku-San-Sei Million Arthur—*", FAMITSU App beta ver., Kadokawa Corporation Enterbrain, FAMITSU App No. 004, Oct. 2012, available at http://web.archive.org/web/20121014153717/http://app.famitsu.com/20121013_99021, along with a partial English language translation.

Office Action issued in Japan Patent Appl. No. JP 2014-261846, dated Mar. 29, 2016, along with an English translation thereof.

* cited by examiner

TASK RELATED INFORMATION (BATTLE RELATED INFORMATION)

| GROUP NUMBER | ENEMY CHARACTER NUMBER | ENEMY LEVEL | ... | BATTLE HISTORY ||
|---|---|---|---|---|---|
| | | | | PLAYER NUMBER | DAMAGE AMOUNT |
| 0001 | 0010 | 5 | ... | 0000001 | 3000 |
| | | | ... | 0000002 | 4000 |
| | | | ⋮ | ⋮ | ⋮ |
| 0002 | 0010 | 10 | ... | 0000011 | 10000 |
| | | | ... | 0000101 | 5000 |
| | | | ⋮ | ⋮ | ⋮ |
| ⋮ | ⋮ | ⋮ | ⋮ | ⋮ | ⋮ |

ACTION HISTORY DISPLAY SCREEN
(BATTLE HISTORY DISPLAY SCREEN)

VIDEO GAME PROCESSING APPARATUS AND VIDEO GAME PROCESSING PROGRAM

CROSS-REFERENCE TO RELATED APPLICATION

This application is a continuation application of the pending U.S. application Ser. No. 14/167,322 filed on Jan. 29, 2014, which claims the benefit of priority of the Japanese Patent Application No. 2013-080668 filed on Apr. 8, 2013, the contents of which are expressly incorporated by reference herein in their entireties.

BACKGROUND OF THE INVENTION

1. Field of the Invention

The present invention relates to a video game processing apparatus and a video game processing program for controlling progress of a video game in which a plurality of players carries out actions in turn, whereby a predetermined action effect is generated.

2. Description of the Related Art

Heretofore, a large number of systems each of which provides a video game in which a plurality of users can participate via a communication network have been proposed.

In such a system, there is one in which, in a case where a user connects to a network and makes a chat with other user, by distinguishing a user having a relationship as a friend on progress of the video game from a user having a hostile relationship and transmitting chat information in accordance with a distinguishing result, necessary chat information is transmitted to each player who participates in the same video game, whereby the player to whom the information is transmitted has an advantage on the progress of the video game or can become aware of existence of an enemy (see Japanese Patent Application Publication No. 2005-34303, for example).

However, in such a system, in a case where a user is playing a video game but other user does not play the video game, chat information is not displayed on a display screen of a user terminal operated by the user. For that reason, there has been a problem that the user may not obtain a feeling of joint struggle and a feeling of solidarity with other users in the video game.

SUMMARY OF THE INVENTION

The present invention has been made in order to solve the problem described above, and it is an object of the present invention to be able to provide a feeling of joint struggle and a feeling of solidarity with other users to a user (or player) in a video game.

In order to achieve the above object, in one aspect of the present invention, the present invention is directed to a video game processing apparatus for controlling progress of a video game. In this case, a plurality of players addresses a common task in the video game. The video game processing apparatus according to the present invention includes a task related information memory for storing task related information, the task related information including a task that a player can challenge in the video game.

The video game processing apparatus also includes a task request receiver for receiving a task providing request from the player.

The video game processing apparatus also includes a task specifier for specifying a task corresponding to the task providing request.

The video game processing apparatus also includes an other player related information generator for generating other player related information, the other player related information indicating other player corresponding to the specified task.

The video game processing apparatus also includes a task screen display controller for displaying a task screen, the task screen showing the task specified by the task specifier.

The video game processing apparatus also includes an other player related information display controller for displaying at least part of the other player related information generated by the other player related information generator on the task screen.

By configuring the video game processing apparatus as described above, it is possible to provide a feeling of joint struggle and a feeling of solidarity with other users to the player in the video game.

In the video game processing apparatus according to the present invention, it is preferable that the task related information includes action histories of each of at least the plurality of players who challenged the task, the task request receiver receives the task providing request presenting identification information of the player; the other player related information generator generates the other player related information by setting up an order to the action histories; and the other player related information display controller displays an image indicating to at least one of the action histories in accordance with the order.

In the video game processing apparatus according to the present invention, it is preferable that the task related information indicates the action histories in chronological order; and the other player related information generator sets up the order in accordance with the chronological order. In this case, the other player related information display controller includes: an enlivening sentence generator for generating an enlivening sentence, the enlivening sentence being a character string different from a character string according to the action histories; and an enlivening sentence display controller for displaying the generated enlivening sentence at predetermined timing.

In the video game processing apparatus according to the present invention, it is preferable that the other player related information display controller includes a display determiner for determining whether all of the action histories to which the order is set up is displayed or not; the other player related information display controller includes a character string display controller; and the character string display controller displays the enlivening sentence generated by the enlivening sentence generator in a case where the display determiner determines that all of the action histories is displayed.

In the video game processing apparatus according to the present invention, it is preferable that the task is a battle in which a plurality of groups to each of which a plurality of players belongs puts down a common enemy character. In this case, the video game processing apparatus may further includes: an action result value calculator for calculating a damage of the enemy character in the battle as an action result value, the damage being applied to the enemy character by each of the plurality of groups or each player who belongs to the group; a change rate decider for deciding a change rate of a form of a variable object on the basis of the action result value calculated by the action result value calculator, the variable object changing in accordance with the action result value of each of the plurality of groups; an upper limit decider for deciding an upper limit of the change rate of the variable object on the basis of an initial value of a damage acceptable amount of the enemy character and an accumulated value of the damage applied to the enemy character by the group or the player; and a display form decider for deciding a display form of the variable object on the basis of the upper limit in a case where the change rate decided by the change rate decider and the upper limit decided by the upper limit decider have a predetermined relationship.

In the video game processing apparatus according to the present invention, it is preferable that the other player related information generator generates the other player related information containing process information on the basis of the action histories indicated by the task related information, the process information indicating a process until the task becomes a state when the task providing request is received; and the other player related information display controller displays an image on the basis of the process information, the image indicating the process until the task becomes the state when the task providing request is received.

Moreover, in another aspect of the present invention, the present invention is directed to a non-transitory computer-readable medium including a video game processing program product for causing a computer to control progress of a video game. In this case, a plurality of players addresses a common task in the video game. Further, the computer includes a task related information memory for storing task related information, the task related information regarding a task that a player can challenge in the video game. The video game processing program product according to the present invention causes the computer to execute steps including receiving a task providing request from the player.

The steps also include specifying a task corresponding to the task providing request.

The steps also include generating other player related information, the other player related information indicating other player corresponding to the specified task.

The steps also include displaying a task screen, the task screen showing the task specified in the specifying a task.

The steps also include displaying at least part of the other player related information generated in the generating other player related information on the task screen.

According to the present invention, it is possible to provide a feeling of joint struggle and a feeling of solidarity with other users to a user (or player) in a video game.

BRIEF DESCRIPTION OF THE DRAWINGS

The foregoing and other objects, features and advantages of the present invention will become more readily apparent from the following detailed description of a preferred embodiment of the present invention that proceeds with reference to the appending drawings.

DETAILED DESCRIPTION OF THE INVENTION

Hereinafter, an example of one embodiment of the present invention will be described with reference to the appending drawings.

Figure 1:
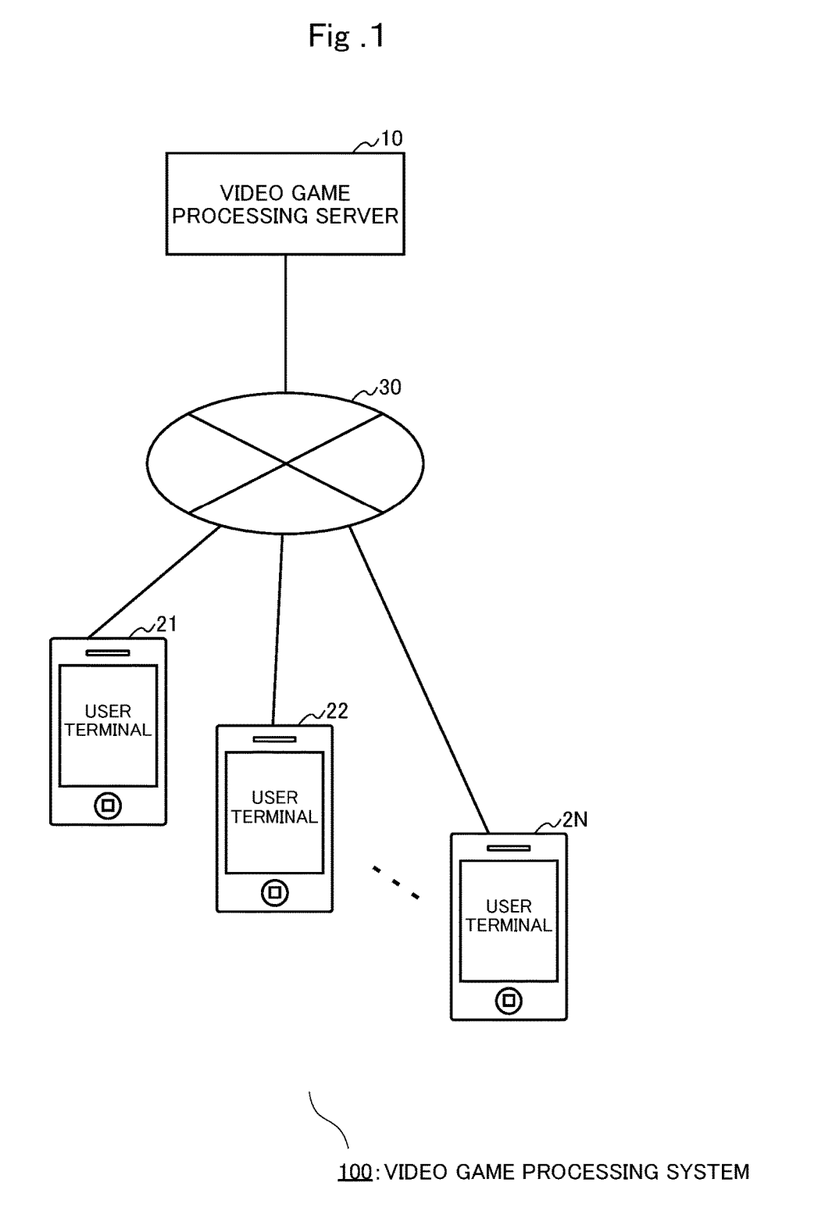
FIG. 1 is a block diagram showing an example of a configuration of a video game processing system.

FIG. 1 is a block diagram showing an example of a configuration of a video game processing system 100 according to one embodiment of the present invention. As shown in FIG. 1, the video game processing system 100 includes: a video game processing server 10; and a plurality of user terminals 21 to 2N ("N" is an arbitrary integer) respectively used by a plurality of users. In this regard, the configuration of the video game processing system 100 is not limited to this configuration. The video game processing system 100 may be configured so that a single user terminal is used by a plurality of users. Alternatively, the video game processing system 100 may be configured so as to include a plurality of servers.

Each of the video game processing server 10 and the plurality of user terminals 21 to 2N is connected to a communication network 30 such as the Internet. In this regard, although it is not shown in the drawings, each of the plurality of user terminals 21 to 2N is connected to the communication network 30 by carrying out data communication with a base station managed by a carrier by means of a wireless communication line.

The video game processing system 100 has various kinds of functions to control progress of a video game (a so-called online game) in which a plurality of players plays in the same virtual space (including a synchronous virtual space and an asynchronous virtual space).

The video game processing server 10 is managed by an administrator of the video game processing system 100, and has various kinds of functions to provide (or deliver) information on the video game to the user terminals 21 to 2N.

The video game processing server 10 is configured by an information processing apparatus such as a WWW server, and includes a storage medium for storing various kinds of information. In this regard, it is preferable that in the video game processing system 100, the information regarding the video game is managed by the video game control server 10 in the light of the fact that a processing load on each of the plurality of user terminals 21 to 2N is to be reduced in the video game processing system 100. However, the video game processing system 100 may be configured so that each of the plurality of user terminals 21 to 2N manages part of the information on the video game.

Figure 2:
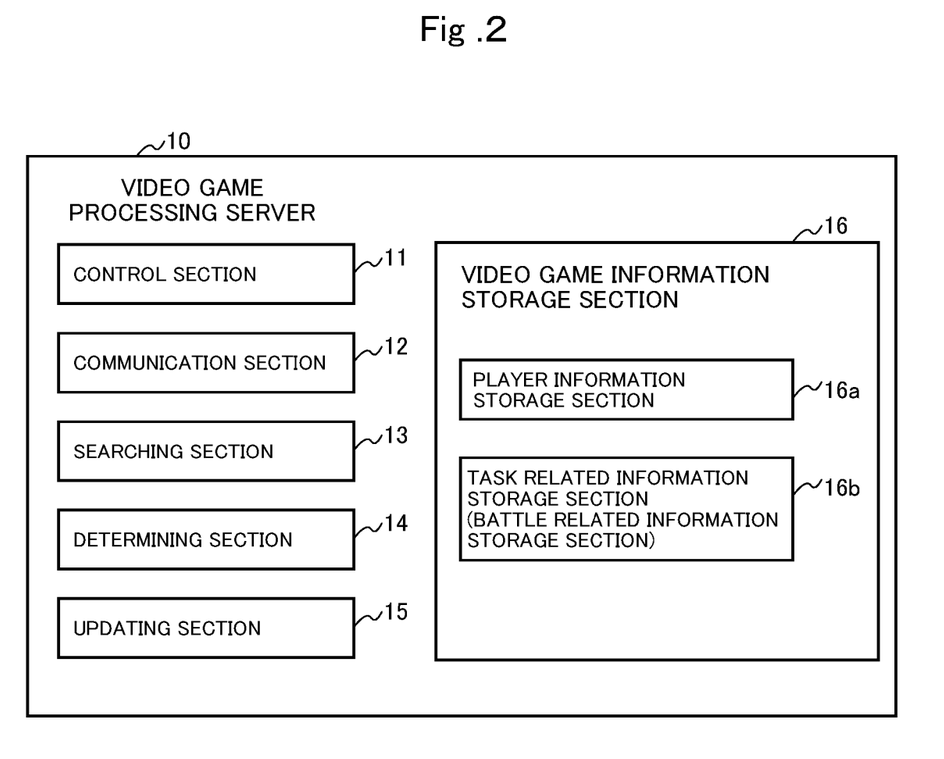
FIG. 2 is a block diagram showing an example of a configuration of a video game processing server.

FIG. 2 is a block diagram showing an example of a configuration of the video game processing server 10. As shown in FIG. 2, the video game processing server 10 includes: a control section 11; a communication section 12;

a searching section 13; a determining section 14; an updating section 15; and a video game information storage section 16.

The control section 11 includes a CPU, a ROM and the like, and has a function to carry out controls of the whole video game processing server 10 in accordance with control programs stored in the video game information storage section 16.

The communication section 12 has a function to carry out communication with each of the plurality of user terminals 21 to 2N via the communication network 30 such as the Internet.

The searching section 13 has a function to search for information according to progress of the video game (for example, information according to a progress status of the video game in each user terminal) from among various kinds of information stored in the video game information storage section 16.

The determining section 14 has a function to carry out various kinds of determinations in accordance with progress of the video game. In the present embodiment, the determining section 14 has a function to carry out various kinds of determinations in task related processing (will be described later; see FIG. 4) on the basis of various determination conditions stored in the video game information storage section 16.

The updating section 15 has a function to update various kinds of information stored in the video game information storage section 16 in accordance with progress of the video game. In this regard, the video game processing server 10 may be configured so that the information used for updating processing is acquired from the plurality of user terminals 21 to 2N. Alternatively, the video game processing server 10 may be configured so that such information is prepared in advance in the video game information storage section 16.

The video game information storage section 16 is configured by a database apparatus, for example. The video game information storage section 16 is a storage medium for storing various kinds of information on the video game whose progress is controlled by the video game control system 100 and various kinds of data such as control programs for the video game.

Here, an outline of the video game whose progress is controlled by the video game processing system 100 will be described. In the present embodiment, the video game processing system 100 controls progress of a so-called online RPG (online role-playing game) that is played by the corresponding player in each of the plurality of user terminals 21 to 2N. Namely, the video game processing system 100 controls progress of the video game in which some relationship between the plurality of users who respectively operate the plurality of user terminals 21 to 2N is generated.

In the present embodiment, the video game is configured so as to include a battle scene (that is, a configuration of a so-called online battle RPG) in which a player (that is, a user of the user terminal) causes a main character (a player character) of a story to use virtual cards. The video game according to the present embodiment includes, as a common task that the plurality of players has to address (or deal with), a battle (that is, a boss battle) in which the plurality of players fight a specific enemy character. Hereinafter, the boss battle will be described. In the boss battle, each player establishes a deck by combining virtual cards possessed by the player before start of a battle, and attacks an enemy character using the deck that indicates various statuses including an HP and an offensive power (ATK). Then, in a case where a winning condition against an enemy character by the attack of each player (for example, a condition that an HP of the enemy character is reduced to zero within a time limit) is satisfied, a privilege (for example, a virtual card corresponding to the defeated enemy character) is given to each of the players who participate in the boss battle in accordance with a level of the enemy character, the amount of the damage applied to the enemy character by each player, and the like. Further, an experience value is given to each player character in accordance with the degree of damage applied to the enemy character. The experience value given to the player character influences on the level of the player character.

In order to control progress of the video game described above, in the present embodiment, video game information storage section 16 includes a player information storage section 16a and a task related information storage section 16b (see FIG. 2).

The player information storage section 16a is a storage medium for storing player information. The player information is information regarding each player. In the present embodiment, the player information indicates information that is required for the player to carry out the video game, such as identification information and a level of the player, a possessed item (not shown in the drawings).

The task related information storage section 16b is a storage medium for storing task related information. The task related information is information that indicates a task that the player can challenge in the video game. In the present embodiment, the case where the task related information is information regarding a battle that is carried out in accordance with progress of the video game (that is, battle related information) will be described as an example. In this regard, the task indicated by the task related information is not limited to a battle against an enemy character. The task may be a task that a plurality of players can share as a task, such as quiz, a puzzle and the like.

In the present embodiment, the battle related information indicates information on the boss battle, in particular, a battle (that is, a group battle) between an enemy character that each player can encounter incidentally for a predetermined period of time (for example, one week) and a group to which the player who encountered the enemy character belongs.

Figure 3:
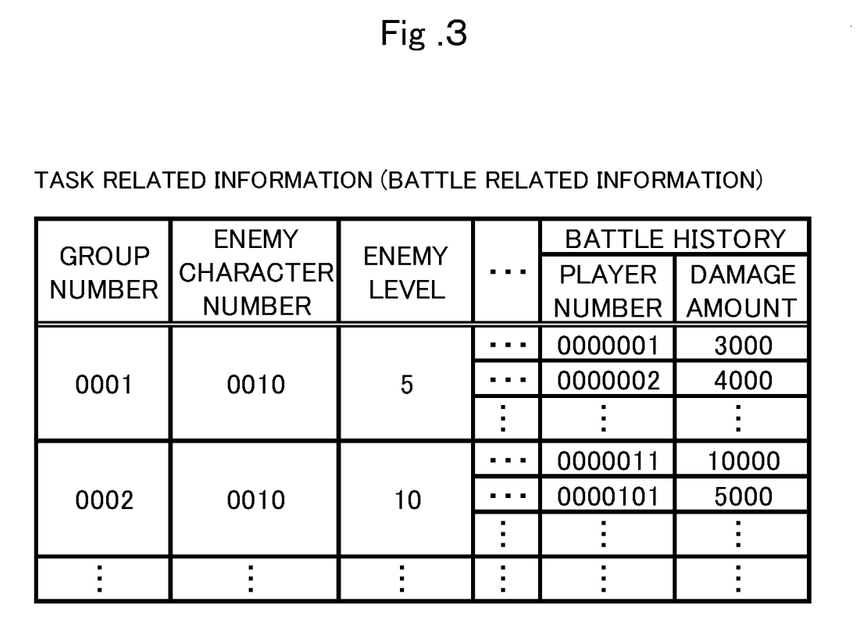
FIG. 3 is an explanatory drawing showing an example of a storage state of task related information.

FIG. 3 is an explanatory drawing showing an example of a storage state of the task related information (hereinafter, referred to appropriately as "battle related information") stored in the task related information storage section (hereinafter, referred to appropriately as a "battle related information storage section") 16b. As shown in FIG. 3, the battle related information contains: a group number for uniquely specifying each of groups; an enemy character number for uniquely specifying an enemy character; and an enemy level of the enemy character; a battle history.

Each of the groups is a group that is established by players of a predetermined number (for example, thirty players) in accordance with a predetermined rule (for example, a rule in which a player with a closer level is preferred, and the like; or in a random manner). Further, in the present embodiment, establishment and breakup of a group is executed automatically at predetermined intervals (for example, every one week) during an event period, for example. In this regard, the rule to determine a group is not limited to this rule. For example, the video game processing system 100 may be configured so that each of the players carries out group registration.

The enemy level is raised (or increased) by a predetermined number (for example, one level) whenever the group won an enemy character. Namely, the player who belongs to the group encounters an enemy character by means of searching, and carries out a group battle. When the group battle is terminated, the player encounters an enemy character by means of the searching again. Each of the players plays the video game in this manner.

The battle history is an action history of a player who belongs to the group. In the present embodiment, a player number indicating a player who carried out an attack against an enemy character as the action, and an effect by the action (that is, the action effect; more specifically, the amount of damage applied to the enemy character) are stored as the battle history.

Each of the plurality of user terminals 21 to 2N is managed by the corresponding user (or player) who carries out the video game, and is configured by a mobile communication terminal, such as a cellular phone terminal, a PDA (Personal Digital Assistants) and a mobile game apparatus, by which the user can play a network delivery-type game, for example. Each of the plurality of user terminals 21 to 2N has hardware (for example, a display device for displaying a game screen, an audio output device and the like) and software to carry out a video game by connecting the user terminal 21 to 2N to the communication network 30 and carrying out communication with the video game processing server 10. In this regard, the video game processing system 100 may be configured so that the plurality of user terminals 21 to 2N can directly communicate with each other without passing through the video game processing server 10.

Next, an operation of the video game processing system 100 according to the present embodiment will be described. In this regard, the content of operations and/or processing with no relationship to the present invention may be omitted.

Figure 4:
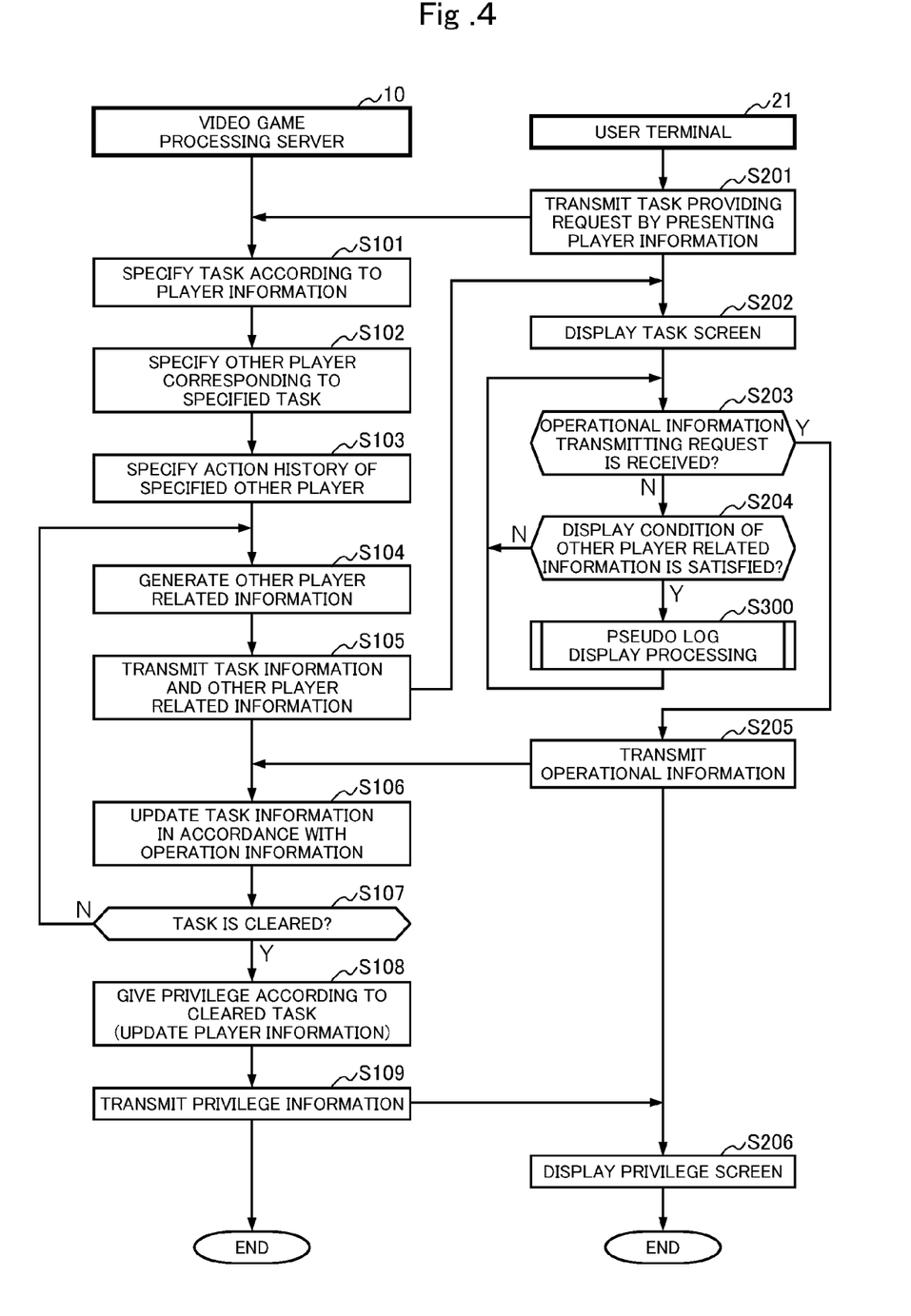
FIG. 4 is a flowchart showing an example of task related processing.

FIG. 4 is a flowchart showing an example of task related processing carried out by the video game processing system 100. In the task related processing, the processing related to the fact that the player challenges a task is carried out. Hereinafter, the case where the video game processing server 10 and the user terminal 21 carry out the task related processing will be described as an example. In this regard, the present embodiment will be described so that step numbers of No. 100s are applied to processes carried out by the video game processing server 10 and step numbers of 200s and 300s are applied to processes carried out by the user terminal 21.

The task related processing is started in a case where a request to provide a task by a user (a player P1) of the user terminal 21 is received in the user terminal 21, for example.

In the task related processing, the user terminal 21 first transmits a task providing request to the video game processing server 10 (Step S201). The task providing request (a request to provide a task) is carried out by presenting the player information. In the present embodiment, the user terminal 21 transmits, to the video game processing server 10, a display request of a battle screen by presenting identification information of the player P1. The battle screen shows an enemy character.

When the task providing request is received, the video game processing server 10 specifies a task according to the presented player information (Step S101). In the present embodiment, the video game processing server 10 specifies an enemy character that the player can fight (or oppose) by referring to the player information and the task related information.

When the task is specified, the video game processing server 10 specifies other player corresponding to the specified task (Step S102). In the present embodiment, the video game processing server 10 refers to the task related information indicating the specified task, and specifies a player (except for the player P1) stored in the battle history as other player. In this regard, the video game processing system 100 may be configured so that the video game processing server 10 does not set up a player who satisfies an exclusion condition that has been defined in advance as the other player. In this regard, it is thought, as the exclusion condition, various conditions including a temporal condition, such as a condition that "a battle history is registered before thirty minutes or longer from the current time", and a condition related to the action result, such as a condition "a specific amount of damages is not applied".

When the other player is specified, the video game processing server 10 specifies the action history of the specified other player (Step S103). In the present embodiment, the video game processing server 10 specifies the content indicated by the task related information (in the present embodiment, battle history) as the action history of the other player.

When the action history of the other player is specified, the video game processing server 10 generates other player related information (Step S104). In the present embodiment, the video game processing server 10 sets up an order to the action history of the player who has challenged the task, and generates a character string indicating each action history (or selects a character string from a group of character strings prepared in advance), thereby generating the other player related information. In this regard, in the present embodiment, in order to manage the battle history in chronological order (that is, in time series), the video game processing server 10 decides how many hours from now of the battle history is utilized (or how many pieces from the latest piece of the battle history is utilized), whereby the order is set up to the battle history. Further, in the present embodiment, the video game processing server 10 refers to player information of each of the other players, and generates other player related information so that a virtual card set up as a leader by each of the other players can be utilized as an identification image of each of the other players.

When the other player related information is generated, the video game processing server 10 transmits the task related information and the other player related information to the user terminal 21 (Step S105).

When the task related information and the other player related information are received, the user terminal 21 displays a task screen based on the task related information on a display screen of a display device (Step S202). In the present embodiment, the user terminal 21 displays a battle screen on the display screen of the display device that includes a touch panel. The battle screen includes: an enemy character; and virtual buttons for receiving an operational input by the player.

Figure 5:
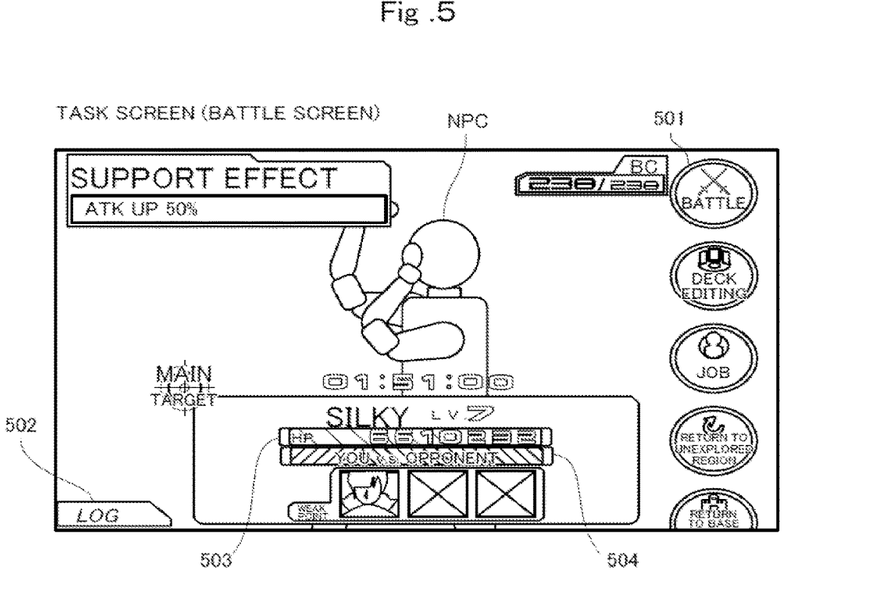
FIG. 5 is an explanatory drawing for explaining an example of a task screen.
Figure 10:
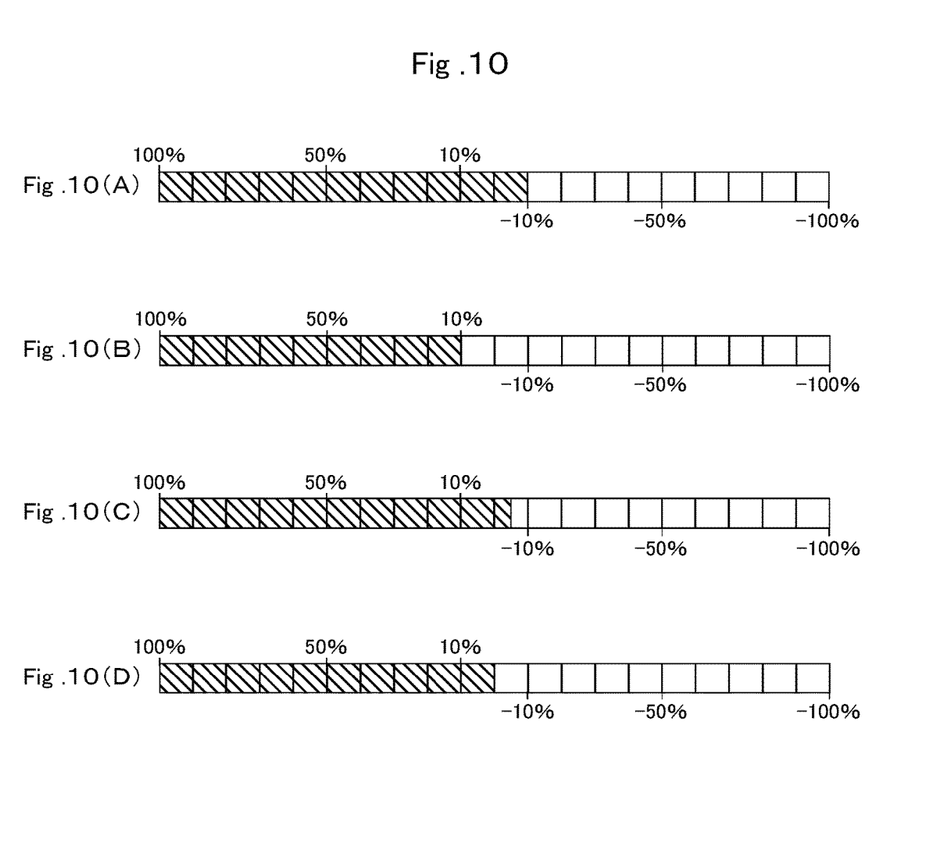
FIGS. 10A to 10D are explanatory drawings for explaining an example of an applied damage bar.

FIG. 5 is an explanatory drawing for explaining an example of the task screen. As shown in FIG. 5, an enemy character NPC; virtual buttons 501 for receiving a request to carry out a boss battle against the enemy character NPC; a log button 502; an HP gauge 503 indicating the HP of the enemy character NPC; and an applied damage bar 504 indicating a rate of damages (applied damages) that two types of groups that participate in a battle against the enemy character NPC (including a group to which the player P1 belongs and a group to which the player P1 does not belong) apply to the enemy character NPC are provided on the battle screen as the task screen according to the present embodiment. In this regard, the applied damage bar 504 will be described later (see FIG. 10).

When the task screen is displayed, the user terminal 21 determines whether a request to transmit the operational information (operational information transmitting request) is received or not (Step S203). In the present embodiment, the user terminal 21 determines that the operational information transmitting request is received in a case where a touch operation of the player toward a display position of the virtual button 501 is detected.

In a case where it is determined that no operational information transmitting request is received because no touch operation toward the display position of the virtual button 501 is received within a predetermined time, for example, ("No" at Step S203), the user terminal 21 determines whether a display condition of the other player related information is satisfied or not (Step S204). In the present embodiment, in a case where any operation is not received from the player for a specific time, the user terminal 21 determines that the display condition of the other player related information is satisfied.

In a case where it is determined that the display condition of the other player related information is satisfied, the user terminal 21 carries out processing to display a pseudo action history (or a pseudo log) on the task screen (that is, pseudo log display processing) (Step S300). In this regard, in the present embodiment, the case where the user terminal 21 refers to other player related information to appropriately display an action history or enlivening sentence will be described as an example. However, the configuration of pseudo log display processing is not limited to this configuration. The video game processing system 100 may be configured so that the other player related information may be displayed in accordance with an elapse of time. Namely, for example, the video game processing system 100 may be configured so that the video game processing server 10 transmits, to the user terminal 21, information (pseudo log display information) indicating an action history or enlivening sentence to be displayed or erased in accordance with the elapse of time in the process at Step S105 and the user terminal 21 displays the task screen in accordance with the received pseudo log display information. Further, the video game processing system 100 may be configured so that the user terminal 21 determines, when to display a pseudo log, whether a predetermined update condition is satisfied or not, and starts to communicate with the video game processing server 10 to update the other player related information in a case where it is determined that the predetermined update condition is satisfied. Namely, the video game processing system 100 may be configured so that the user terminal 21 automatically updates the other player related information when to display a screen (Chivalric order TOP screen) before a process at Step S205 (a process to transmit the operational information to the video game processing server 10; will be described later) is carried out. In this case, it is preferable that the update condition is a condition that can be satisfied in a status that it is thought to be highly possible that the other player related information is updated in the video game processing server 10, such as the case where no operational information transmitting request is received until a specific time (for example, three minutes) elapses from the time when the task screen is displayed, for example.

Figure 6:
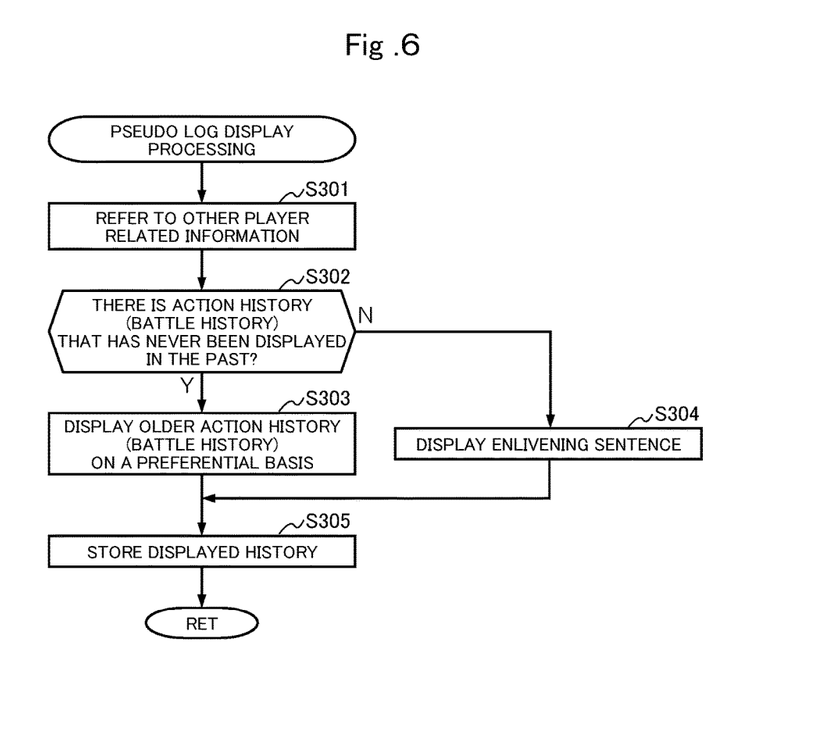
FIG. 6 is a flowchart showing an example of pseudo log display processing.

FIG. 6 is a flowchart showing an example of pseudo log display processing carried out by the user terminal 21. In the pseudo log display processing according to the present embodiment, a battle history (or battle log information) and a sentence (enlivening sentence; for example, a sentence "a player P2 is fascinated by an enemy" and the like) to be displayed for enlivening with no relationship with the battle are displayed. Here, the battle history means a battle history contained in the other player information. In the present embodiment, the user terminal 21 displays the battle history in a case where the player selects the log button 502 (see FIG. 5) on the battle screen on which an enemy character appears.

Figure 7:
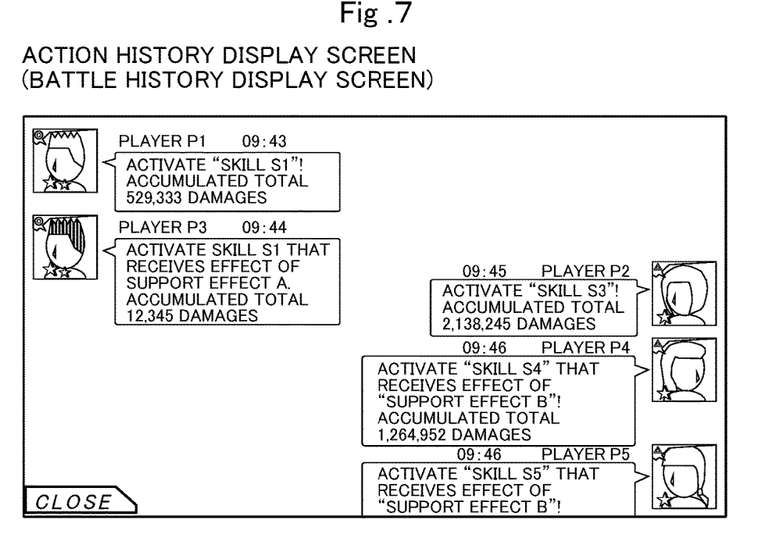
FIG. 7 is an explanatory drawing for explaining an example of a battle history display screen.

FIG. 7 is an explanatory drawing for explaining an example of a battle history display screen. As shown in FIG. 7, an image indicating a battle history of each of the other players who belong to the same group (Chivalric order) as that of the player P1 is arranged at the left side of the battle history display screen. On the other hand, an image indicating a battle history of each of other players who belong to groups different from that of the player P1 is arranged at the right side of the battle history display screen. In this regard, it is preferable that these images are configured so that the player P1 can distinguish his or her own Chivalric order from the opponent's Chivalric order by means of color coding or the like, for example. In this regard, a name of other player, its image, an action time and the action content (in particular, an activated support effect, a skill, and the sum total of damages each of which is applied to the enemy character in each turn in a case where one attack is constructed by a plurality of turns), which are displayed on the battle history display screen in the present embodiment, are obtained from the video game processing server 10.

In the pseudo log display processing, the user terminal 21 first refers to the other player related information (Step S301). In the present embodiment, the user terminal 21 refers to the other player related information, and distinguishes a battle history that has already been displayed since the task screen was displayed from battle histories that has never been displayed. In this regard, the video game processing system 100 may be configured so that, in a case where the action history of the player P1 is contained in the other player related information received from the video game processing server 10, the user terminal 21 excludes the battle history of the player P1 from a display target. By configuring the video game processing system 100 in this manner, the battle history of the player P1 himself or herself is displayed, and this makes it possible to eliminate the possibility of interfering with a feeling of joint struggle of the player.

By referring to the other player related information, the user terminal 21 determines whether there is a battle history that has never been displayed in the past or not (Step S302). Here, in a case where it is determined that there is a battle history that has never been displayed in the past ("Yes" at Step S302), the user terminal 21 displays an older battle history (that is, a battle history indicating an action that has been carried out earlier than the other actions) on the display screen on a preferential basis (Step S303). In the present embodiment, the user terminal 21 in turn displays an image indicating a battle history of a predetermined number (for example, one) at predetermined time intervals.

Figure 8:
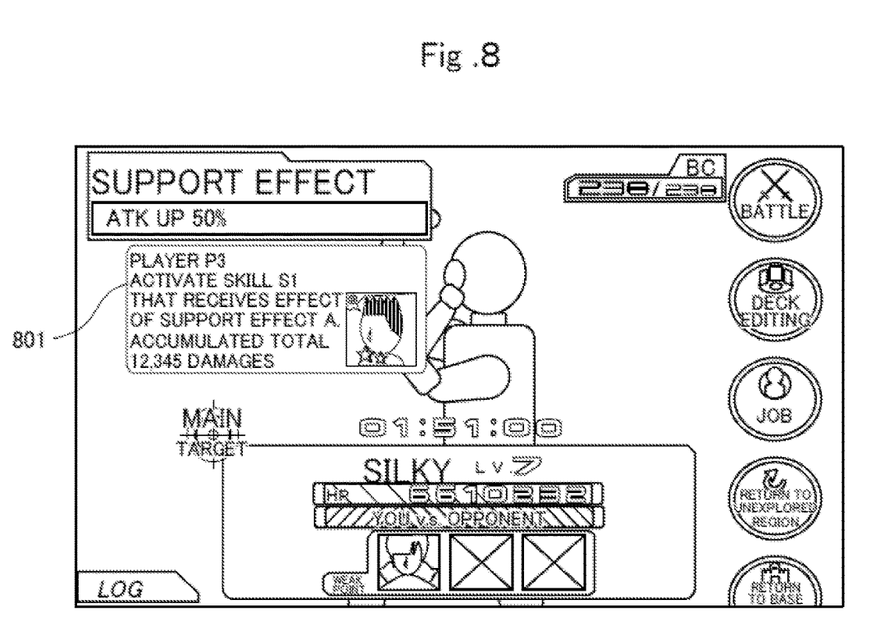
FIG. 8 is an explanatory drawing for explaining an example of a display form of an action history.

FIG. 8 is an explanatory drawing for explaining an example of a display form of an action history (in the present embodiment, a battle history). The battle history is indicated by an image 801 for showing a battle history on the task screen (battle screen) shown in FIG. 8. In this regard, the video game processing system 100 may be configured so that the user terminal 21 displays an image or images indicating the battle history a predetermined number by a predetermined number (for example, one). Namely, the video game processing system 100 may be configured so that the user terminal 21 displays a battle history of the other player P2 for a predetermined time (for example, for one second); and erases the image indicating the battle history, which has been displayed until that time, instead of displaying an image indicating a battle history that was carried out next time in a case where the user terminal 21 does not receive any operational input from the player P1 in the predetermined time, for example.

On the other hand, in a case where it is determined that there is no battle history that has never been displayed in the past ("No" at Step S302), the user terminal 21 displays an enlivening sentence (Step S304). In the present embodiment, the user terminal 21 generates an image including a character string in accordance with the content of the other player related information and a predetermined character string output rule; and displays the generated image. In this regard, it is preferable that the video game processing system 100 is configured so that the content of the character string to be generated is not continued. For example, the video game processing system 100 may be configured so that a character string is associated with other player by selecting the character string from among a group of character strings prepared in advance in turn or at random.

Figure 9:
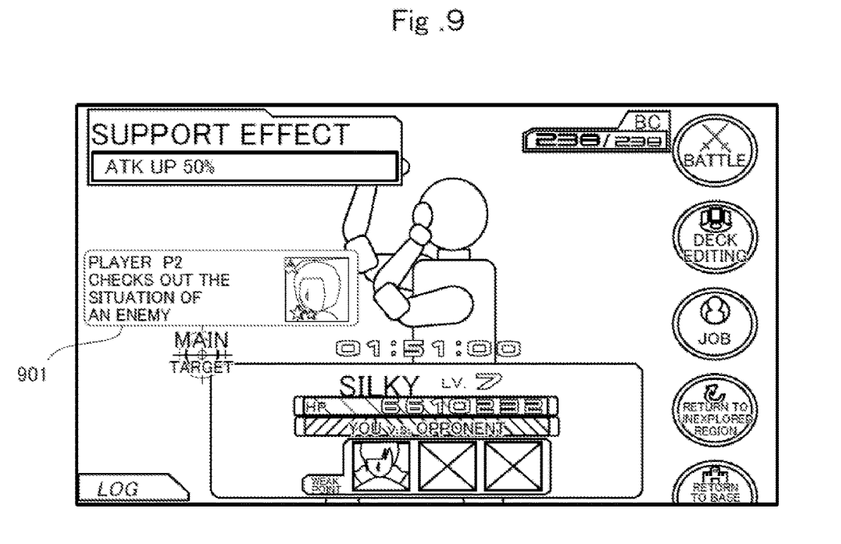
FIG. 9 is an explanatory drawing for explaining an example of a display form of enlivening sentence.

FIG. 9 is an explanatory drawing for explaining an example of a display form of an enlivening sentence. On the task screen shown in FIG. 9, the enlivening sentence is displayed by means of an image indicating the enlivening sentence. In this regard, although various display forms of the enlivening sentence are also thought as well as the battle history, it is preferable that the display form of the enlivening sentence does not deteriorate visibility of the task screen.

In this regard, in the present embodiment, the image 801 indicating the battle history and an image 901 indicating an enlivening sentence are displayed at coordinates decided within a specific range on the screen (for example, random coordinates). Namely, when the user terminal 21 decides an image to be displayed, the user terminal 21 also decides a position at which the image is displayed. By providing variation in positions of images to be displayed in turn, it becomes possible to add movement to the task screen. In this regard, the video game processing system 100 may be configured so that the group to which other player corresponding to an image belongs influences on a display position of the image (for example, an image corresponding to other player who belongs to the same group as the player P1 is displayed at the left side of the screen).

When the action history or enlivening sentence is displayed, the user terminal 21 stores the displayed history (Step S305), and causes the processing flow to proceed to the process at Step S203 in the task related processing (see FIG. 4). By configuring the video game processing system 100 in this manner, it is possible to display the battle history that has never been displayed in a case where the player enters a battle before all of the battle history is displayed completely (that is, in a case where an operational information transmitting request is received) and a battle screen is then displayed. Namely, in a case where the battle history "(1) you (the player P1) attacks an enemy→(2) Mr. A attacks the enemy→(3) Mr. B attacks the enemy→(4) Mr. C attacks the enemy" is stored for the player P1 and the player P1 enters a battle in a state that only the sentences "(1) you attacks an enemy" and "(2) Mr. A attacks the enemy" are displayed in the pseudo log (that is, a state that an image corresponding to the sentence "(2) Mr. A attacks the enemy" is just displayed on the screen) and then the battle is terminated, for example, the user terminal 21 displays an image corresponding to the sentence "(3) Mr. B attacks the enemy" next time. However, since information on only the past thirty items is stored in the battle history, the user terminal 21 may skip a battle history (past log) that has overflowed.

In a case where it is determined that the operational information transmitting request is received because the touch operation toward the display position of the virtual button 501 on the task screen is received ("Yes" at Step S203), the user terminal 21 transmits the operational information to the video game processing server 10 (Step S205). In the present embodiment, the user terminal 21 transmits an attack request against the enemy character NPC by the player P1 to the video game processing server 10 as the operational information.

When the operational information is received, the video game processing server 10 updates the task related information in accordance with the received operation information (Step S106). In the present embodiment, the video game processing server 10 calculates a damage to be applied to the enemy character NPC by the player P1, and updates the task related information so that the calculated damage is subtracted from a remaining HP of the enemy character NPC. In this regard, the user terminal 21 refers to the player information, and calculates the damage to be applied to the enemy character NPC by the player P1 in accordance with numerical values of predetermined items including a current offensive power and an HP of the player P1 (each of which is a value calculated by the virtual card constituting the deck), a deck cost and a current battle cost of the player P1 (that is, a value indicating a deck cost that the player P1 can use; this value is consumed whenever the player P1 makes an attack against any enemy character NPC).

When the task related information is updated, the user terminal 21 determines whether the player P1 cleared the task or not (Step S107). In the present embodiment, in a case where the updated task related information satisfies a clear condition (more specifically, in a case where the HP of the enemy character NPC becomes zero), the user terminal 21 determines that the task is cleared. Here, in a case where it is determined that the task is not cleared ("No" at Step S107), the video game processing server 10 causes the processing flow to proceed to the process at Step S104. On the other hand, in a case where it is determined that the task is cleared ("Yes" at Step S107), the video game processing server 10 gives the player P1 a privilege according to the task that the player P1 has cleared (Step S108). In the present embodiment, the video game processing server 10 gives the player P1 the privilege, for which each player satisfies a giving condition, from among privileges for each of which the giving condition has been set up in advance on the basis of a ratio of the damage applied to the enemy character NPC by the player P1 and the damage applied to the enemy character NPC by the other player(s) who participates in the battle against the enemy character NPC (for example, a ratio of the applied damages against the maximum HP of the enemy character NPC) (more specifically, the video game processing server 10 updates the player information corresponding to each player).

In this regard, the method of deciding the privilege to be applied to each player by the video game processing server 10 is not limited to one based on the applied damage. For example, the video game processing system 100 may be configured so as to use a method based upon the degree that each character contributes to defeat the enemy character NPC (the degree of contribution). In this case, the video game processing system 100 may be configured so that the video game processing server 10 decides two types of the degrees of contribution, that is, "the degree of contribution for attack" and "the degree of contribution for remaining HP" as the degree of contribution, for example. In this case, the video game processing system 100 may be configured so that the degree of contribution for attack is calculated on the basis of a damage applied to the enemy during one battle (that is, the more the damage to be applied is, the more the amount of privilege to be applied is increased), and the degree of contribution for remaining HP is calculated on the basis of the his or her own remaining HP at the end of one battle against the enemy (the more the HP is, the more the amount of privilege to be applied is increased). Further, the video game processing system 100 may be configured so that as the method of deciding the degree of contribution, the video game processing server 10 uses the method of reflecting battle progress to the degree of contribution, such as the method of reflecting the number of times of attacks and/or a consumed item and the like to the degree of contribution, for example.

Here, the "applied damage bar" that is an element related to the applied damage according to the present embodiment will be described. The applied damage bar 504 shown in FIG. 5 indicates a ration between the sum total of the damage applied to the enemy character NPC by the group to which the player P1 belongs and the sum total of the damage applied to the enemy character NPC by groups to which the player P1 does not belong. In the present embodiment, the video game processing server 10 provides a difference among privileges to be applied to the respective players when to put down (or subjugate) the enemy character in accordance with the magnitudes of the damages applied to the enemy character NPC by the respective groups. For that reason, each player is also allowed to watch the applied damage bar to determine the magnitudes of group damages, and to think whether the player attacks the enemy character by consuming a battle cost or not. In this regard, the video game processing system 100 may be configured so that the user terminal 21 does not display the applied damage bar but displays an element indicating a status of a battle against an enemy character, such as a bar indicating a ratio among the degrees of contribution of a plurality of groups (a contribution degree bar). Alternatively, the video game processing system 100 may be configured so that the user terminal 21 displays such an element in addition to the applied damage bar, for example. In this regard, in this case, the video game processing system 100 may be configured so that the user terminal 21 distinguishably shows each of the degree of contribution for attack and the degree of contribution for remaining HP to the user. By displaying plural kinds of the degree of contribution by kind, for example, it is possible to suggest the tendency of action of the other players to the user.

FIGS. 10A to 10D are explanatory drawings for explaining an example of an applied damage bar. The configuration to display the applied damage bar according to the present embodiment has a point "the absolute value to be varied with respect to a current HP of an enemy is determined". Namely, by configuring the video game processing system in this manner, it is possible to avoid unnaturalness, in which a ratio of applied damages becomes "you: 100%, opponent: 0%" at a first attack against an enemy, from occurring. Namely, the amplitude of the applied damage bar that changes in accordance with the magnitude of the applied damages of a group (you) to which the player P1 belongs and a group (opponent) to which the player P1 does not belong results in the value "(the maximum HP of the enemy–the current HP of the enemy)/the maximum HP of the enemy". For example, when the maximum HP of the enemy is 500 and the HP of the enemy is reduced by 50, the ratio of the HP becomes "(500−450)/500=0.1". Therefore, the amplitude of the applied damage bar becomes within ±100. Namely, for example, "when only you applies 50 damages to the enemy, that is, when the opponent never attacks the enemy", the applied damage bar becomes a state shown in FIG. 10A. Further, "when only the opponent applies 50 damages to the enemy, that is, when you never attacks the enemy", the applied damage bar becomes a state shown in FIG. 10B. Further, "when you applies 37.5 damages to the enemy and the opponent applies 12.5 damages to the enemy", the applied damage bar becomes a state shown in FIG. 10C. Further, "when each of you and the opponent applies 25 damages to the enemy, that is, the applied damages are the same as each other", the applied damage bar becomes a state shown in FIG. 10D. In this regard, the information for displaying the applied damage bar is stored in the task related information storage section 16*b*.

When the player information is updated, the video game processing server 10 transmits privilege information to the user terminal 21 (Step S109). The privilege information indicates a privilege to be given to the player P1. In the present embodiment, the video game processing server 10 transmits, to the user terminal 21, information indicating that the task is cleared (or completed) (that is, information indicating that the enemy character is defeated) in addition to the privilege information.

When the privilege information is received, the user terminal 21 displays a privilege screen showing the privilege and the like (not shown in the drawings) on the basis of the received privilege information (Step S206), and terminates the processing herein.

As explained above, in the embodiment described above, the video game processing apparatus (for example, the video game processing server 10 or the user terminal 21) for controlling progress of the video game in which a plurality of players addresses a common task for example, subjugation of an enemy character) is configured so as to: include a task related information memory (for example, the task related information storage section 16*b*) for storing task related information, the task related information regarding a task that a player can challenge in the video game and an action history of the player who challenged the task; receive a task providing request from the player P1 (for example, Step S201); specify a task corresponding to the task providing request (for example, Step S101); refer to the specified task related information; generate other player related information, the other player related information indicating other player corresponding to the specified task (for example, Step S104); display a task screen, the task screen showing the specified task (for example, Step S202); and display at least part of the generated other player related information (for example, the battle history) on the task screen (for example, Step S300). Therefore, it is possible to provide a feeling of joint struggle and a feeling of solidarity with other users to the player in the video game.

Namely, it becomes possible to display information indicating existence of other user on a game screen of the user (player). Therefore, it is possible to provide a feeling to cause the video game to proceed together with the other user even to a user who plays the video game by himself or herself.

Further, in the embodiment described above, the video game processing apparatus (for example, the video game processing server 10 or the user terminal 21) is configured so as to: receive the task providing request by presenting identification information of the player (for example, Step S101); generate the other player related information by setting up an order to the action history of the player who challenges the task (for example, Step S104); and display an image indicating the action history of the player in accordance with the order (for example, Step S300). Therefore, it is possible to give the game screen movement, and this makes it possible to represent a feeling of joint struggle and a feeling of solidarity with other users to the player in the video game effectively.

Further, in the embodiment described above, the video game processing apparatus (for example, the video game processing server 10 or the user terminal 21) is configured so that the task related information (for example, the battle related information) indicates the action history of the player who challenged the task in chronological order; and so as to: set up the order in accordance with the chronological order (for example, by using an execution time of the battle indicated by the battle history); generate an enlivening sentence, the enlivening sentence being a character string different from a character string according to the action history of the player who challenged the task; and display the generated enlivening sentence at predetermined timing (for example, when all of the battle history is displayed) (for example, Step S300). Therefore, it is possible to provide a feeling of joint struggle and a feeling of solidarity to the user without displaying the same action history for all time in the video game.

Further, in the embodiment described above, the video game processing apparatus (for example, the video game processing server 10 or the user terminal 21) is configured so as to: determine whether all of the action history (for example, the battle history contained in the other player related information received by the user terminal 21) of the player who challenged the task to which the order is set up is displayed or not (for example, Step S302); and display the generated enlivening sentence in a case where it is determined that all of the action history is displayed. Therefore, it becomes possible to use an actual battle history (actual log) and the generated pseudo log by appropriately using them for different purposes.

In this regard, although it has not been mentioned particularly in the embodiment described above, the video game processing apparatus (for example, the video game processing server 10 or the user terminal 21) may be configured so as to: generate the other player related information containing process information (for example, image information indicating the action content of the other player character and a state of an enemy character that is varied by the action content) on the basis of the action history (for example, the battle history) of the player who challenged the task indicated by the task related information (for example, the battle related information), the process information indicating a process until the task becomes a state when the task providing request is received; and display an image on the basis of the process information, the image indicating the process (or course) until the task becomes the state when the task providing request is received. Namely, the video game processing apparatus (for example, the video game processing server 10 or the user terminal 21) may be configured so as to carry out, when to display a pseudo log on the task screen (for example, see the image 801 show in FIG. 8), action representation in time with the display; and reduce an HP of the enemy in time with the action representation. In this case, the video game processing apparatus may be configured so as to add the HP to be reduced in the pseudo log to the HP on the surface of a local (for example, a process in the user terminal 21) in advance, for example. In this regard, in a case where the video game processing apparatus is configured in this manner, the video game processing apparatus may be configured so as to: restore the HP to a state where the HP added on the surface is not added after the player watches the battle history (for example, see FIG. 7); and cause the player to watch a situation that the HP of the enemy is suddenly reduced by the damage displayed in the battle history. Moreover, in this case, the video game processing apparatus (for example, the video game processing server 10 or the user terminal 21) may be configured so as to change the display form of the meter (for example, applied damage bar 504; also see FIG. 5 and FIG. 10) of the applied damages of the group to which the player belongs and the other groups on the local (for example, a process in the user terminal 21) as well as the HP on the surface.

In this regard, although it has not been mentioned particularly in the embodiment described above, the video game processing apparatus (for example, the video game processing server 10 or the user terminal 21) may be configured so as to display the content determined from a progress status of a task (for example, a status of the battle) of the local (for example, a process in the user terminal 21) in the enlivening sentence. In this case, for example, the video game processing apparatus may be configured so as to: carry out the displayed action representation (for example, representation in which the image 801 indicating the battle history attacks the enemy character NPC); subtract the HP of the enemy character in accordance with progress of the representation (for example, change the display form of an HP gauge); and display the enlivening sentence in which the display condition is satisfied so as be associated with the other player when the display condition of a progress status of the video game (for example, the HP of the enemy character and the damage applied to the enemy character by each player or each group) satisfies the enlivening sentence (for example, the video game processing apparatus may be configured so as to display the sentence "a player P3 is glad that the player P3 will win nearly" when the HP of the enemy character NPC becomes one tenth (1/10) or display the sentence "the player P3 is delighted that the applied damage is turned back by the opponent Chivalric order" when the applied damage is turned back by the opponent group). By configuring the video game processing apparatus in this manner, it is possible to enrich a variation of the character strings to be displayed on the game screen.

In this regard, the case where the video game processing apparatus (for example, the video game processing server 10 or the user terminal 21) does not synchronize with other video game processing apparatuses (that is, the video game processing apparatus is set to an asynchronous state) has been explained in the embodiment described above. However, the video game processing apparatus may be configured so that a plurality of video game processing apparatuses (for example, the video game processing servers 10 or the user terminals 21) synchronizes with each other and each of the plurality of video game processing apparatuses displays the other player related information on the display screen of its own display device. In this case, the video game processing apparatus may be configured so that the video game processing server 10 transmits the action history to the user terminal 21 operated by a player other than the player who records the action history whenever to record an action history of each of the plurality of players who address a common task. The video game processing apparatus may also be configured so as to display the enlivening sentence in the user terminal 21 of each player when the video game processing server 10 does not transmit the action history, for example. In this case, the video game processing server 10 may be configured so as to generate the enlivening sentence to transmit the generated enlivening sentence to the user terminal 21, for example. Alternatively, the video game processing server 10 may be configured so as to transmit a command to display enlivening sentence stored in the user terminal 21 to the user terminal 21. By configuring the video game processing system 100 in this manner, it is possible to provide a feeling of joint struggle and a feeling of solidarity with other users to the player in the video game, i.e., a MMO (Massively Multiplayer Online Role-Playing Game). Further, the video game processing system 100 may be configured so that, in case of causing a plurality of video game processing apparatus to synchronize with each other, the variation of the applied damage bar is reflected in real time with synchronous communication.

In this regard, the configuration of the applied damage bar has been described in the embodiment described above with reference to the appending drawings. Hereinafter, the case where an object (variable object) whose form is varied (or changed) in accordance with progress of the video game, such as the applied damage bar, is dealt with in the embodiment described above will be described as an example.

Figure 11:
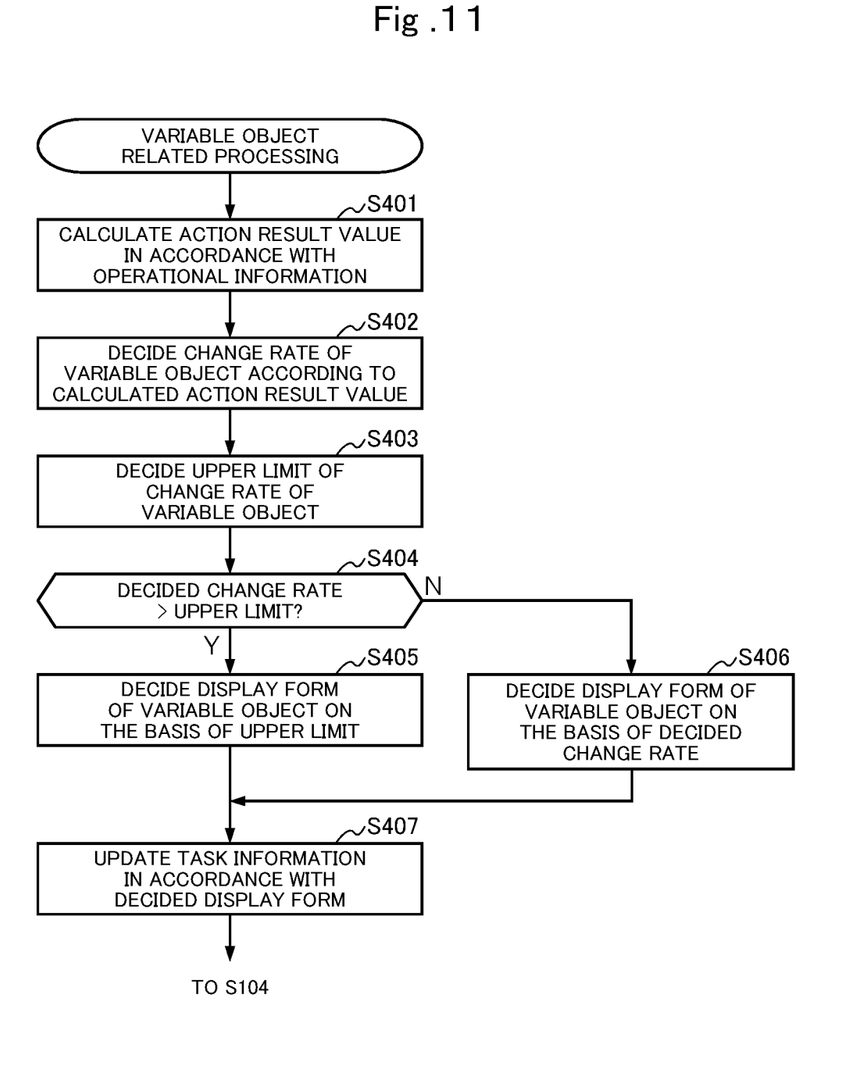
FIG. 11 is a flowchart showing an example of variable object related processing.

FIG. 11 is a flowchart showing an example of variable object related processing carried out by the video game processing server 10. In the variable object related processing, processing to manage the applied damage bar described above (see FIG. 10) as a variable object and to cause each of the plurality of the user terminals 21 to 2N to display the applied damage bar in the form according to a progress status of a task (in the present embodiment, a battle) is carried out.

The variable object related processing is started in a case where the video game processing server 10 determines that the task is not cleared in the process at Step S107 in the task related processing described above (see FIG. 4), for example.

The video game processing server 10 calculates an action result value in accordance with operational information received from the user terminal 21 (Step S401). In the present embodiment, the video game processing server 10 calculates a damage that the player P1 applies to the enemy character NPC as the action result value.

When the action result value is calculated, the video game processing server 10 decides a change rate of the variable object according to the calculated action result value (Step S402). In the present embodiment, the video game processing server 10 decides, as the change rate, "the action result value/the maximum HP of the enemy character NPC (the value obtained by dividing the action result value by the maximum HP of the enemy character NPC)".

When the change rate is decided, the video game processing server 10 decides an upper limit of the change rate of the variable object (Step S403). In the present embodiment, the video game processing server 10 decides "(the maximum HP of the enemy character−the current HP of the enemy character)/the maximum HP of the enemy character" as the upper limit of the change rate.

When the upper limit is decided, the video game processing server 10 determines whether the decided change rate exceeds the decided upper limit or not (Step S404). Here, in a case where it is determined that the decided change rate exceeds the decided upper limit ("Yes" at Step S404), the video game processing server 10 decides a display form of the variable object on the basis of the upper limit (Step S405). In the present embodiment, the video game processing server 10 varies a boundary location between groups in the applied damage bar on the basis of the upper limit (for example, 10%).

On the other hand, in a case where it is determined that the decided change rate does not exceed the decided upper limit ("No" at Step S404), the video game processing server 10 decides the display form of the variable object on the basis of the decided change rate (Step S406).

When the change rate of the variable object is decided, the video game processing server 10 updates the task related information in accordance with the decided display form (Step S407), and causes the processing flow to proceed to the process at Step S104 in the task related processing (see FIG. 4). For this reason, the video game processing server 10 allows user terminals operated by players who will challenge the same task next time to display the variable object after update (that is, the updated variable object).

As described above, by configuring the video game processing apparatus so as to provide the upper limit to the change rate of the variable object (for example, determine the absolute value that varies against the current HP of the enemy character with respect to the variation of the applied damage bar occurred by attacking the enemy character once by the player), it is possible to prevent a situation that the variable object changes from the beginning of the task immediately from occurring, and this makes it possible to improve interest of the player in the video game. Namely, in a case where two groups vies the total damage applied to a common enemy, a ratio of the damages applied to the enemy character by the respective groups until now is displayed using the applied damage bar, for example. In this case, in a case where the upper limit of the ratio to vary the applied damage bar by one attack is not provided, a situation in which it appears that there is a large difference between a ratio of the damage applied to an enemy by one group and a ratio of the damage applied to the enemy by the other group on the applied damage bar in spite of the beginning of the task occurs. For that reason, the players who belong to the other group may be discouraged. On the other hand, by providing the upper limit of the ratio to vary the applied damage bar by one attack like the embodiment described above, it is possible to provide the video game in which a situation between competing groups readily varies as the task proceeds in the latter part thereof, but the situation hardly varies in the beginning of the task, and this makes it possible to effectively avoid a situation to demoralize the player from the beginning of the task.

Further, like the variable object related processing described above, the video game processing apparatus (for example, the video game processing server 10 or the user terminal 21) is configured so as to: set up a battle, in which a plurality of groups to each of which a plurality of players belongs puts down a common enemy character, to the task; calculate a damage of the enemy character in the battle as an action result value, the damage being applied to the enemy character by each of the plurality of groups or each player who belongs to the group (for example, Step S401); decide a change rate of a form of a variable object (for example, applied damage bar 504) on the basis of the action result value calculated by the action result value calculator, the variable object changing in accordance with the action result value of each of the plurality of groups (for example, Step S402); decide the upper limit of the change rate of the variable object on the basis of an initial value of a damage acceptable amount of the enemy character (for example, the maximum HP) and an accumulated value of the damage applied to the enemy character by the group or player (for example, the current HP of the enemy character, which can be calculated from the accumulation of the damage) (for example, Step S403); and decide the display form of the variable object on the basis of the upper limit (for example, Step S405) in a case where the decided change rate and the decided upper limit have a predetermined relationship (for example, in a case where the change rate exceeds the upper limit). Therefore, it is possible to provide the video game that can attract the user by means of the variable object.

Further, in the embodiment described above, each of the plurality of user terminals 21 to 2N and the video game processing server 10 carries out the various processes described above in accordance with various control programs (for example, the video game processing program) stored in the storage device (memory) included in the user terminal 21 to 2N or the video game processing server 10 itself.

In this regard, the configuration of the video game processing system 100 is not limited to the configuration described above. For example, the video game processing system 100 may be configured so that the video game processing server 10 carries out a part or all of the processes that have been explained as the processing carried out by the user terminal. Alternatively, the video game processing system 100 may be configured so that any of the plurality of user terminals 21 to 2N (for example, the user terminal 21) carries out a part or all of the processes that have been explained as the processing carried out by the video game processing server 10. Further, the video game processing system 100 may be configured so that each of the user terminals 21 to 2N includes a part or all of the storage sections included in the video game processing server 10. Namely, the video game processing system 100 may be configured so that any one of the user terminal 21 and the video game processing server 10 in the video game processing system 100 includes a part or all of the functions included in the other thereof.

INDUSTRIAL APPLICABILITY

The present invention is useful to allow a video game to provide a feeling of joint struggle and a feeling of solidarity with other users to a user in the video game.

The invention claimed is:

1. A video game processing apparatus for controlling progress of a video game, in which a plurality of players address a common task using different client devices, the video game processing apparatus comprising:
a processor that specifies a task corresponding to a task providing request of a first player operating a first client device, and generates player related information of a second player that corresponds the specified task, the second player operating a second client device; and
a display controller that displays the player related information of the second player, on a task screen of the first client device of the first player, for facilitating communication between the first device and the second device,
wherein the display controller further displays a first image including a character string in association with the second player, the character string satisfying a display condition during progress of the specified task, and the task screen indicating the specified task,
wherein the player related information of the second player is generated when the second player challenges a same specified task as the first player, and
wherein the character string corresponds to the player related information of the second player.

2. The video game processing apparatus according to claim 1,
wherein the display controller displays the first image including the character string satisfying the display condition, the display condition relating to the progress status of the task.

3. The video game processing apparatus according to claim 1,
wherein the display controller displays the first image including the character string satisfying the display condition, the display condition relating to elapsed time from starting of the task.

4. The video game processing apparatus according to claim 1,
wherein the processor generates a second image including a second character string which is different from a character string corresponding to an action history of the first player or the second player, and
wherein the display controller displays the second image including the second character string at a predetermined timing.

5. The video game processing apparatus according to claim 1,
wherein the second player is one or more players different from the first player.

6. A non-transitory computer-readable medium including a video game processing program product for causing a computer having a processor to control progress of a video game, in which a plurality of players address a common task using different client devices,
wherein the video game processing program product causes the computer to execute:
specifying a task corresponding to a task providing request of a first player operating a first client device;
generating player related information of a second player that corresponds the specified task, the second player operating a second client device; and
displaying the player related information of the second player, on a task screen of the first client device of the first player, for facilitating communication between the first device and the second device,
wherein the displaying further includes further displaying an image including a character string in association with the second player, the character string satisfying a display condition during progress of the specified task, and the task screen indicating the specified task,
wherein the player related information of the second player is generated when the second player challenges a same specified task as the first player, and
wherein the character string corresponds to the player related information of the second player.

* * * * *